(No Model.)

W. C. FRICK.
METHOD OF THREADING SPLIT TUBES.

No. 543,238. Patented July 23, 1895.

Witnesses:
R. Schleicher
F. C. Binner

Inventor:
William C. Frick
by his Attorneys
Howson & Howson

UNITED STATES PATENT OFFICE.

WILLIAM C. FRICK, OF DANVILLE, PENNSYLVANIA.

METHOD OF THREADING SPLIT TUBES.

SPECIFICATION forming part of Letters Patent No. 543,238, dated July 23, 1895.

Application filed December 3, 1894. Serial No. 530,677. (No model.)

*To all whom it may concern:*

Be it known that I, WILLIAM C. FRICK, a citizen of the United States, and a resident of Danville, Montour county, Pennsylvania, have invented certain Improvements in Methods of Threading Split Tubes, of which the following is a specificaton.

The object of my invention is to thread a split tube—that is, a tube which is bent from a blank and the abutting edges of which are not welded. This object I attain in the following manner, reference being had to the accompanying drawings, in which—

Figure 1:
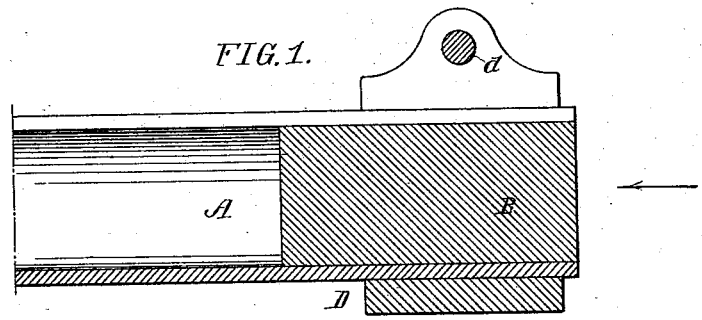
Figure 2:
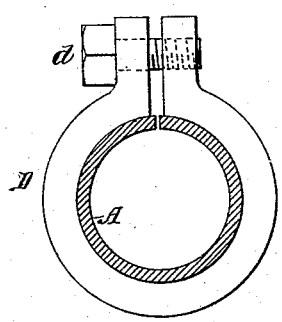
Figure 3:
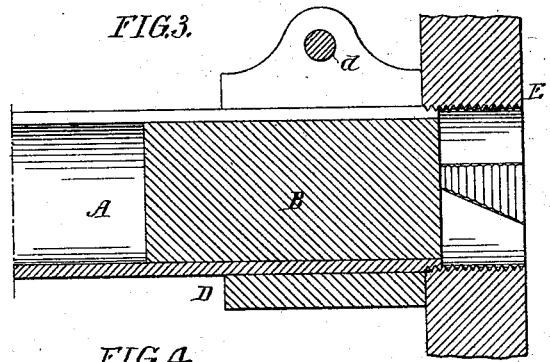
Figure 4:
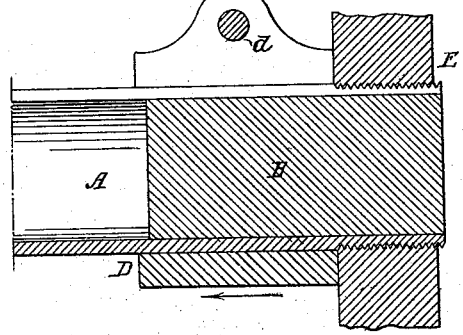
Figure 5:
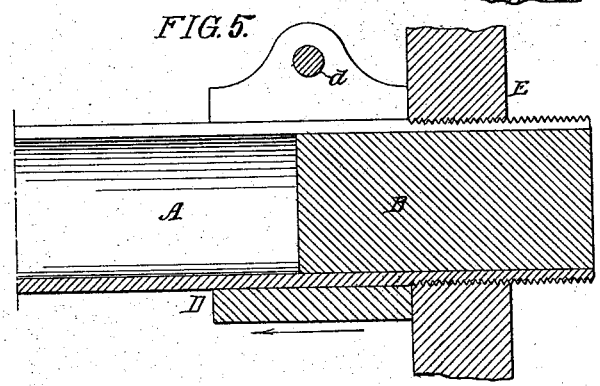

Figure 1 is a longitudinal sectional view showing the tube ready to be threaded. Fig. 2 is an end view looking in the direction of the arrow, Fig. 1. Figs. 3, 4, and 5 are diagram views illustrating the different steps in the process.

I find that it is almost impossible to thread a split tube by the ordinary methods, as the tube is liable to be distorted by the action of the die and the thread is liable to be cut unevenly or to tear during the process of cutting. Furthermore, the tube will yield to the dies, preventing the proper cutting of the thread. I overcome these objections in the following manner:

I place within the end of the tube A to be threaded a plug B, which accurately fits the interior of the tube, as shown in Fig. 1, and I then provide a clamp D, having a screw *d*, in the present instance, which binds the tube upon the plug, as clearly shown in Fig. 2, the screw *d* passing through an ear on one portion of the clamp and into a threaded opening in an ear on the opposite portion, so that on turning the screw the clamp will draw the tube together and upon the plug. I mount the clamp on the tube a short distance from the end, so as to allow the threading-die E, which is of the ordinary construction, to gain a thread-hold upon the tube, and as the die is turned it will force the clamp D before it, as shown in Fig. 4, the threads cut in the tube forming an abutment for the die, so that the clamp can be screwed upon the tube with sufficient force to hold it rigidly upon the block; but still the die as it is turned will force the clamp forward until the screw-thread is completely cut, as shown in Fig. 5, after which the die can be removed, the clamp detached, and the plug removed from the threaded tube.

I claim as my invention—

1. The process herein described of cutting an external thread on a split tube, said process consisting in first securing a clamp upon the tube so as to draw the edges of the tube toward each other, second, applying a threaded die to the tube, third, turning the die and cutting a thread on the tube, said die pushing the clamp before it, substantially as described.

2. The process herein described of threading split tubes, said process consisting in placing a plug within the tube, securing a clamp on the tube a short distance from the end and applying a die to the projecting end of the tube and feeding said die forward on the tube and forcing the clamp forward as the die proceeds, substantially as described.

In testimony whereof I have signed my name to this specification in the presence of two subscribing witnesses.

WILLIAM C. FRICK.

Witnesses:
WILL. A. BARR,
JOSEPH H. KLEIN.